(12) United States Patent
Sun et al.

(10) Patent No.: US 12,232,055 B2
(45) Date of Patent: Feb. 18, 2025

(54) UPPER LAYER DESIGN FOR RELEASE 16 MIMO ENHANCEMENT

(71) Applicant: Apple Inc., Cupertino, CA (US)

(72) Inventors: Haitong Sun, Cupertino, CA (US); Dawei Zhang, Saratoga, CA (US); Fangli Xu, Beijing (CN); Haijing Hu, Los Gatos, CA (US); Jie Cui, San Jose, CA (US); Wei Zeng, Saratoga, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,354

(22) PCT Filed: Apr. 8, 2020

(86) PCT No.: PCT/CN2020/083721
§ 371 (c)(1),
(2) Date: Sep. 21, 2021

(87) PCT Pub. No.: WO2021/203285
PCT Pub. Date: Oct. 14, 2021

(65) Prior Publication Data
US 2023/0029514 A1    Feb. 2, 2023

(51) Int. Cl.
*H04W 52/42* (2009.01)
*H04W 52/28* (2009.01)

(52) U.S. Cl.
CPC ......... *H04W 52/42* (2013.01); *H04W 52/288* (2013.01)

(58) Field of Classification Search
CPC ........... H04W 52/00–60; H04W 52/42; H04W 52/288
See application file for complete search history.

(56) References Cited

U.S. PATENT DOCUMENTS

| 10,439,847 B2 | 10/2019 | Park et al. |
| 10,448,425 B2 | 10/2019 | Au et al. |

(Continued)

FOREIGN PATENT DOCUMENTS

| CN | 105191228 | 12/2015 |
| CN | 110710281 A | 1/2020 |

(Continued)

OTHER PUBLICATIONS

International Search Report and Written Opinion of the International Searching Authority directed to related International Patent Application No. PCT/CN2020/083721, dated Dec. 30, 2020; 8 pages.

(Continued)

*Primary Examiner* — Raymond S Dean
(74) *Attorney, Agent, or Firm* — Sterne, Kessler, Goldstein & Fox P.L.L.C.

(57) ABSTRACT

Methods and apparatuses are disclosed for configuring full power transmission modes in a UE. The disclosed full power transmission modes include a Mode 0 and a Mode 3, which are enhancements over previous modes disclosed in the 3GPP specification. The UE gathers supported modes and configuration capabilities, such as number of ports and supported coherency schemes, and forwards the configuration capabilities to the network. The network analyzes the received information and selects a supported full power transmission mode based on the UE capabilities. The selection is then transmitted to the UE in a PUSCH-Config message. The UE extracts the selection from the PUSCH-Config message, and configures its radio accordingly.

20 Claims, 9 Drawing Sheets

(56) References Cited

U.S. PATENT DOCUMENTS

| | | | |
|---|---|---|---|
| 11,206,618 | B2 | 12/2021 | Huang et al. |
| 2012/0195285 | A1* | 8/2012 | Ko .................. H04J 13/00 370/329 |
| 2016/0143002 | A1 | 5/2016 | Lindoff et al. |
| 2017/0156156 | A1 | 6/2017 | Van Phan et al. |
| 2019/0312617 | A1* | 10/2019 | Wernersson ......... H04B 7/0486 |
| 2019/0327691 | A1 | 10/2019 | Zhang et al. |
| 2019/0327693 | A1 | 10/2019 | Rahman et al. |
| 2020/0045644 | A1* | 2/2020 | Sridharan ............ H04B 7/0456 |
| 2020/0154364 | A1* | 5/2020 | Rahman ............... H04B 7/0404 |
| 2021/0092687 | A1* | 3/2021 | Harrison .............. H04B 7/0628 |
| 2021/0250970 | A1 | 8/2021 | Ekpenyong et al. |
| 2022/0353827 | A1* | 11/2022 | Okamura ............. H04B 7/0456 |
| 2023/0069404 | A1* | 3/2023 | Kittichokechai ..... H04W 72/52 |

FOREIGN PATENT DOCUMENTS

| | | |
|---|---|---|
| WO | WO 2019214648 A1 | 11/2019 |
| WO | WO 2020/024855 A1 | 2/2020 |
| WO | WO 2020/065615 A2 | 4/2020 |

OTHER PUBLICATIONS

3GPP, "Cleaning up of power class 2 test cases in FR1," R5-200396, Feb. 28, 2020, accessed at https://www.3gpp.org/ftp/tsg_ran/WG5_Test_ex-T1/TSGR5_86_Electronic/Inbox/Intermediate_CRs?sortby=sizerev.

3GPP TSG RAN WGl # 98, Source: MediaTek Inc., Aug. 26-30, 2019, Full Tx power UL Transmission, retrieved from Url: https://ftp.3gpp.org/tsg_ran/WG1_RL1/TSGR1_98b/Docs/R1-1911730.zip FL summary NR_eMIMO RAN1#98bis-ULFPTX v2.docx, (Oct. 29, 2019), XP051812945, 6 pages.

3GPP TSG RAN WGl # 98, Source: Qualcomm Incorporated., Aug. 26-30, 2019, Full Tx power UL Transmission, retrieved from Url: http://www.3gpp.org/ftp/tsg_ran/WG1_RL1/TSGR1_98/Docs/R1-1909274.zip, (Aug. 17, 2019), XP051765879 [A] 1-15, 11 pages.

Samsung: "View on full power UL transmission", 3GPP Draft; R1-1910495 UL Full Power TX,M3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 4, 2019 (Oct. 4, 2019), XP051808215, Retrieved from the Internet: URL:https://ftp.3gpp.org/tsg_ran/WG1_RL1/TSGR1_98b/Docs/R1-1910495.zip R1-1910495 UL, full power Tx.docx [retrieved on Oct. 4, 2019], 8 pages.

3GPP Draft; FL Summary Nr_Emimo Ran1 #98bis—Ulfptx V2, 3rd Generation Partnership Project (3gpp), Mobile Competence Centre; retrieved from https://ftp.3gpp.org/tsg_ran/WG1_RL1/TSGR1_98b/Docs/R1-1911730.zip FL summary NR_eMIMO RAN1#98bis—ULFPTX v2.docx, (Oct. 29, 2019), XP051812945 [A], Oct. 29, 2019, 10 pages.

Extended European Search Report directed to European Application No. 20930374.2-1206, dated Oct. 20, 2023, 9 pages.

3GPP TSG-RAN WG1 Meeting #100, Feb. 24-Mar. 6, 2020, Ericsson, Corrections for Full Power UL Transmission, retrieved from https://www.3gpp.org/ftp/tsg_ran/WG1_RL1/TSGR1_100_e/Docs/R1-2000818.zip>, Mar. 6, 2020, 6 pages.

Intel Corporation, Remaining details of full Tx power UL transmission [online], 3GPP TSG RAN WG1 #99 R1-1912224, Internet <URL: https://www.3gpp.org/ftp/tsg_ran/WG1_RL1/TSGR1_99/Docs/R1-1912224.zip>, Nov. 22, 2019, 19 pages.

OPPO, Discussion on the Full TX power UL transmission [online], 3GPP TSG RAN WG1 #98b R1-1910118, Internet <URL: https://www.3gpp.org/ftp/tsg_ran/WG1_RL1/TSGR1_98b/Docs/R1-1910118.zip>, Oct. 20, 2019, 12 pages.

Notification of Ground(s) of Rejection with English-language translation directed to Japanese Application No. 2022-560904, dated Oct. 5, 2023, 12 pages.

Office Action and Search Report directed to related Chinese Application No. 202080099464.6, with English-language machine translation attached, dated Sep. 12, 2024; 28 pages.

* cited by examiner

UPPER LAYER DESIGN FOR RELEASE 16 MIMO ENHANCEMENT

CROSS-REFERENCE TO RELATED APPLICATION

This application is a U.S. National Phase of International Application No. PCT/CN2020/083721, filed Apr. 8, 2020, which is hereby incorporated by reference in its entirety.

FIELD

Various embodiments generally may relate to the field of wireless communications.

SUMMARY

In an embodiment, a user equipment (UE) is configured to operate in full power transmission mode by a network. The network transmits a PUSCH-Config message to the UE that identifies a full power transmission mode. The network can select any one of four different modes, by altering the contents of the PUSCH-Config message.

In another embodiment, the UE notifies the network as to its capabilities. The UE can specify whether it is capable of full power transmission, and how many ports the UE has that are capable of functioning in full power transmission. The network transmits a PUSCH-Config message to the UE that configures the UE based on the information received from the UE. In this embodiment, depending on the number of ports the UE identifies for full power transmission, fewer than all four modes may be available for configuration.

In another embodiment, the network further configures port selection in the UE. When the UE is capable of 2 port full-coherent operation, the UE notifies the network as to which modes it supports. When the network seeks to configure 2 port uplink operation, the network will adjust the configuration based on the codebookSubset and the capabilities of the UE. Specifically, the network will adjust the configuration based on whether the codebookSubset is non-Coherent or whether the codebookSubset is configured as fullyAndPartialAndNonCoherent.

In another embodiment, the network is capable of configuring port selection in a 4-port UE. When the UE is capable of 4 port full-coherent operation, the UE notifies the network as to which modes it supports. When the network seeks to configure 4 port uplink operation, the network will adjust the configuration based on the codebookSubset and the capabilities of the UE. Specifically, the network will adjust the configuration based on whether the codebookSubset is nonCoherent or whether the codebookSubset is configured as fullyAndPartialAndNonCoherent.

In another embodiment, a UE includes a memory, a transceiver, and one or more processors. The processors receive at least one full power transmission mode from memory and cause the transceiver to transmit a capabilities message to the network, the capabilities message including at least one supported full power transmission mode capability. The processors receive a configuration message from the network via the transceiver, and extract a selected full power transmission mode from the configuration message. The processors then configure the transceiver according to the selected full power transmission mode.

In embodiments, the configuration message is a PUSCH-Config message.

In embodiments, the transceiver includes a plurality of logical ports, and the memory stores a number of the plurality of logical ports and a coherency capability of the user equipment.

In embodiments, the capabilities message includes the number of the plurality of logical ports and the coherency capability of the user equipment.

In embodiments, the selected full power transmission mode is one of four modes, and is selected based on the capabilities of the user equipment.

In embodiments, the four modes include a Mode 0 in which all power scaling is set to 1 and a Mode 3 in which all power scaling is set equal to a ratio between a number of non-zero power ports of a configured TPMI and a maximum number of ports of the user equipment.

In another embodiment, a method is disclosed for selecting a communication scheme in a user equipment. In the method, the user equipment determines whether it is configured with a first configuration, a second configuration, or both the first configuration and the second configuration. Then, it analyze a first set of conditions or a second set of conditions in response to the determining that the user equipment is configured with only the first configuration or the second configuration, respectively. Based on the analysis, the UE sets a selected communication scheme to be one of a first communication scheme or a second communication scheme.

In embodiments, the first configuration is the user equipment being configured with RepSchemeEnabler and the first set of conditions are analyzed in response to the user equipment being configured with RepSchemeEnabler, the first set of conditions including that the user equipment does not expect RepNum16 to be configured in any entry in PDSCH-TimeDomainResourceAllocation, or that the user equipment ignores RepNum16 that is configured in any entry in PDSCH-TimeDomainResourceAllocation, or that the user equipment does not expect downlink control information (DCI) to indicate an entry in PDSCH-TimeDomainResourceAllocation that contains RepNum16.

In embodiments, the user equipment is further configured with 2 TCI State in DCI and 2 DMRS CDM groups in DCI, and the user equipment is expected to be configured with scheme 1a, or a spatial domain multiplexing (SDM) scheme, or a Non Coherent Joint Transmission (NCJT) scheme, regardless of other configurations, including RepSchemeEnabler or Time Domain Resource Allocation (TDRA) in DCI.

In embodiments, the at least one full power transmission mode capability includes Mode 0 and Mode 3, where Mode 0 sets all power scaling to 1, and Mode 3 sets all power scaling equal to a ratio between a number of non-zero power ports of a configured TPMI and a maximum number of ports of the user equipment.

In embodiments, the number of the plurality of logical ports is 2, and the coherency capability includes full coherent, and the selected full power transmission mode includes one of Mode 0 or Mode 2, Mode 2 setting some TPMIs to power scaling 1 and other TPMIs to different power scaling value.

In embodiments, the number of the plurality of logical ports is 4, and the coherency capability includes full coherent, and the selected full power transmission mode includes one of Mode 0 or Mode 2, Mode 2 setting some of the 4 TPMIs to have power scaling 1 and other TPMIs to a different power scaling value.

In embodiments, it is further determined that the user equipment is being served by multiple cells. In response, a selection is made as to whether to set a BDFactorR complexity value on a per-cell level, or on a per cell group level. Then the BDFactorR is set for each cell of the multiple cells separately in response to selecting the per-cell level, or for all cells in a cell group to be the same in response to selecting the per cell group level.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

DETAILED DESCRIPTION

Release 16 of the 3GPP specification describes certain MIMO enhancements over previous implementations. For example, Release 16 describes multi beam enhancement which reduces overhead and latency. Beam quality measurement and reporting is also available on the L1-SINR. Further, beam failure recovery is available on a second cell. However, as a result of these advantages, Release 16 does not specify how UEs in the 3GPP environment can carry out full power transmission. The present disclosure provides various mechanisms for configuring UEs in the 3GPP environment to implement full power transmission.

Full power transmission for uplink transmission allows a UE to transmit at full power. However, the current 3GPP specification does not define the MAC-level and RRC-level configurations in order to support the MIMO enhancements of Release 16.

In practice, an access point (such as an eNodeB) sends a UE information about what precoding matrix is used as a part of the downlink control information. This precoding matrix is referred to as a transmission precoder matrix indicator (TPMI). Release 16 of the 3GPP specification currently supports two full power transmission modes. In Mode 1, a new coherent transmitted precoder matrix indicator (TPMI) is added to a partial and/or non-coherent codebook subset in order to support full power transmission. Additionally, power scaling follows Release 15 behavior in that power scaling for each TPMI is set to the ratio between the number of non-zero ports and the maximum number of ports. In Mode 2, the UE can indicate to the network a list of TPMIs that the UE is capable of supporting for full power transmission. Those TPMIs are given a power scaling of 1. The remaining TPMIs are given a power scaling equal to the ratio between the number of non-zero ports and the number of actual ports (those configured by the network). The following disclosure describes various methods and/or configurations by which the network can configure full power mode according to various embodiments.

Figure 1:
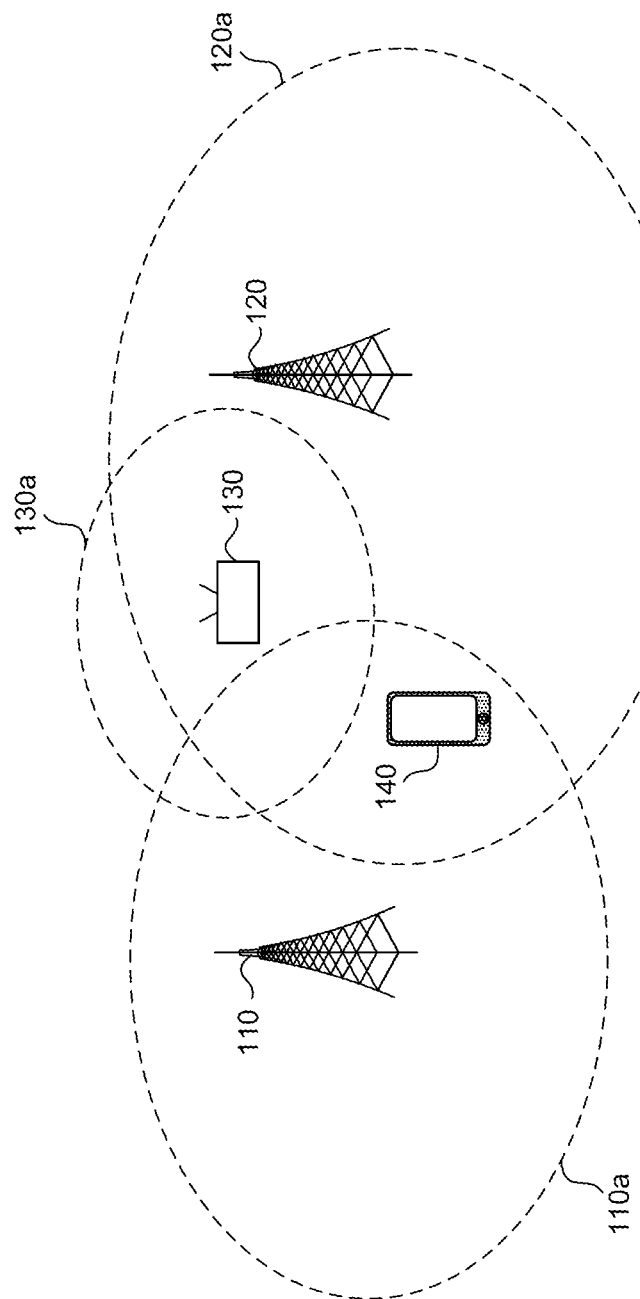
FIG. 1 illustrates an exemplary wireless communication environment according to an embodiment.

FIG. 1 illustrates an exemplary wireless communication environment 100 according to an embodiment. The environment 100 includes base stations 110 and 120, each having respective coverage areas 110*a* and 120*a*. In an embodiment, the base stations 110 and 120 are gNodeBs, eNodeBs, or another network-connected access point. The base stations 110 and 120 are connected to the network backend, and provide cellular connectivity to devices within their respective coverage areas.

An access point 130 may also be disposed in the environment 100, and include its own coverage area 130*a*. The access point can be any other type of transmission and reception point (TRP), such as a macro-cell, small cell, pico-cell, femto-cell, remote radio head, relay node, etc. Together, the base stations 110 and 120 and the access point 130 provide a network of cellular connectivity to UEs in environment 100. One such UE 140 is illustrated as being within the coverage area 110*a* of base station 110 and coverage area 120*a* of base station 120. In operation, a serving base station 110/120 and/or access point 130 will communicate with the UE 140 in order to configure full power transmission.

Figure 2:
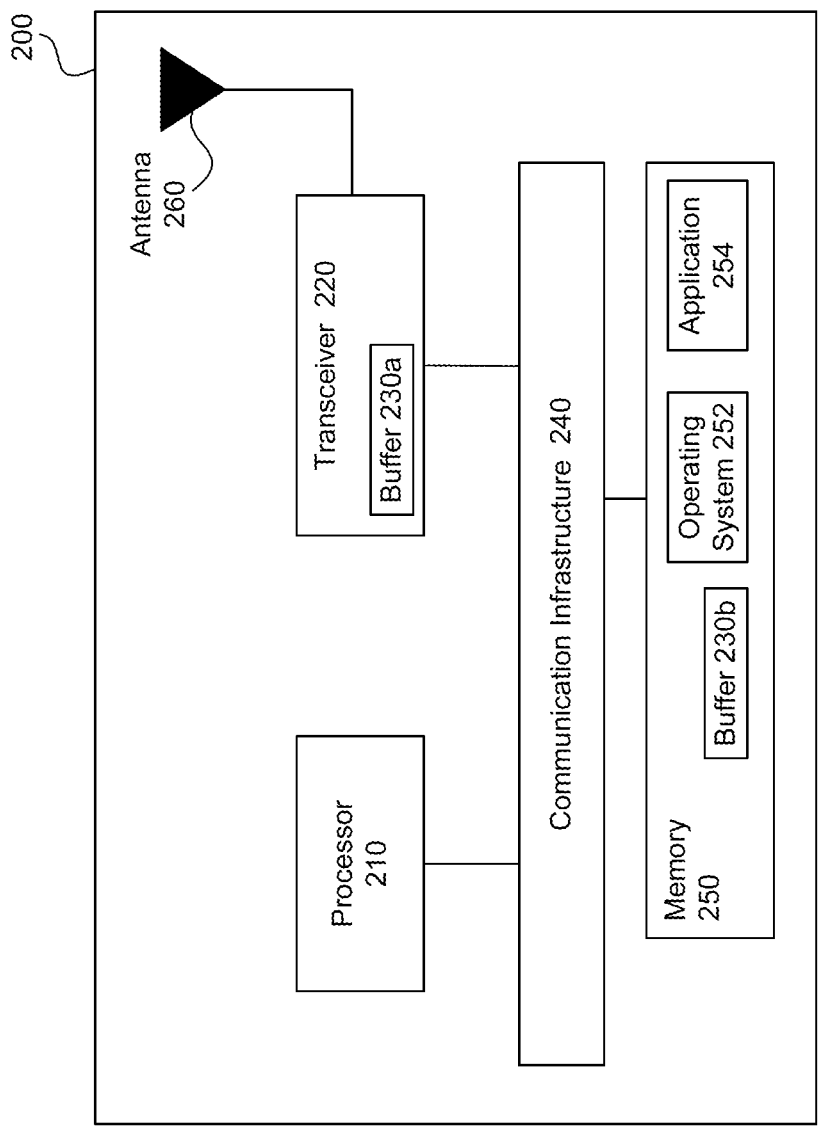
FIG. 2 illustrates a block diagram of an exemplary user equipment according to an embodiment.

FIG. 2 illustrates a block diagram of an example wireless system 200 of an electronic device implementing the measurement signal collision resolution, according to some embodiments of the disclosure. System 200 may be any of the electronic devices (e.g., AP 1010, STA 1020) of environment 100, including UE 140. System 200 includes processor 210, transceiver 220, buffer(s) 230*a* and 230*b*, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, measurement collision resolution, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 perform operations enabling wireless system 200 of system 1000 to implement the measurement collision resolution as described herein. Additionally or alternatively, transceiver 220 performs operations enabling wireless system 200 of system 1000 to implement the measurement collision resolution as described herein.

Transceiver 220 transmits and receives communications signals that support the measurement collision resolution, according to some embodiments, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, carries out the full power transmission configuration. For example, system 200 is configured to generate and send device capabilities to the network, and to receive and implement transmission power configurations from the network, as will be discussed in further detail below.

According to some embodiments, processor 210, alone or in combination with transceiver 220 and/or memory 205 can transmit the UE capabilities. Processor 210, alone or in combination with transceiver 220 and/or memory 205, can receive and implement power transmission configurations.

Full Power Transmission Configuration

In an embodiment, two additional full power transmission modes supplement the existing Modes 1 and 2 defined in the current 3GPP specification. The UE notifies the network as to which of these four modes it supports. Based on the received capabilities of the UE, the network selects one of the four modes. The network then configures the full power transmission mode at the UE via the PUSCH-Config message. Specifically, because there are four available power transmission modes that can be set by the network, the network sets two or more bits within the PUSCH-Config message to identify the desired power transmission mode. Upon reception at the UE, the UE sets the full power transmission mode according to the received PUSCH-Config message.

As discussed above, Modes 1 and 2 exist in the current 3GPP specification. In Mode 1, power scaling follows the power scaling behavior designated in Release 15 of the 3GPP specification. Namely, the number of non-zero ports is divided by the maximum number of ports that the UE can support. The UE then applies the resulting value as the power scaling factor to each of its TPMIs. Additionally, in Mode 1, a new coherent TPMI is added to the codebook subset for the partial and non-coherent codebook sub sets.

In Mode 2, the UE operates partially in full power transmission mode, and partially operates out of full power transmission mode. Specifically, for all TPMIs that the UE has identified as being capable of operating in full power transmission mode, the power scaling factor is set to 1. For all other TPMIs, power scaling is set to the ratio between the number of non-zero power ports divided by the number of ports of the SRS resource indicated by the scheduling DCI.

In a first new mode (Mode 0), all TPMIs are set to have power scaling 1. In a second new mode (Mode 3), the UE operates according to Release 15 with the same power scaling as defined by Release 15. In other words, the power scaling for all TPMIs is set to the ratio of all non-zero ports to maximum number of ports.

Another embodiment supports a UE with 4 uplink ports/layers. In this embodiment, the UE indicates to the network that it supports 4 uplink ports, and that it supports uplink full power transmission. In this instance, the network can configure the UE to operate in full power transmission Mode 2, and configures a UE with an SRS resource set with up to four SRS resources. In this case, at least one SRS resource will have four ports, and at least one SRS resource will have two ports. Additionally, the network will also configure the codebook subset and the full power transmission mode of the UE.

For example, the network will configure the codebook subset for 2-port SRS to be either fullyAndPartialAndNonCoherent or nonCoherent. In an embodiment, the codebook subset type can be hardcoded in the specification, such that it is not necessary to transmit the configuration to the UE from the network. When configuring the full power operation mode for 2-port SRS, Mode 1 is no longer available. Therefore, the network selects from between Modes 0, 2 and 3. As discussed above, the network sets the relevant bits in the PUSCH-Config message based on the selected full power transmission mode, and transmits the message to the UE for configuring the UE. In an embodiment, the full power transmission mode can instead be hardcoded into the specification so that the UE can carry out the proper mode without the network specifically instructing the UE as to the proper mode.

In another embodiment, the network receives indication from the UE that the UE is a 2-port full coherent configuration. In an embodiment, the UE also notifies the network as to whether the UE is capable of supporting Modes 0, 1 or 2. Because the UE is full coherent, there is always a TPMI that uses all the ports. Thus, there is always a TPMI that supports full power transmission, even though there may be others that don't support full power transmission.

Based on received information of the UE, the network will select one of the supported Modes 0, 1 or 2. Notably, the network only selects a Mode that the UE supports. In an embodiment, this selection is further dependent on the codebookSubset of the UE. Specifically, when the codebookSubset is configured as nonCoherent, the network can configure the UE to operate in Modes 0, 1 or 2 only if the UE indicates that it is capable of supported the selected mode. Otherwise, the network configures the UE to operate in Mode 3.

On the other hand, when the codebookSubset is configured as fullyAndPartialAndNonCoherent (e.g., full coherent), Mode 1 is no longer available. Thus, the network can only configure the UE to operate in Modes 0 or 2 if supported by the UE. If neither is supported, then the network must configure the UE to operate in Mode 3. In this embodiment, the network may configure SRS resource with a different number of ports in an SRS resource set, it is prohibited from doing so when Mode 2 is selected. This is because, in Mode 2, it is unnecessary to configure the SRS resource with a different number of ports.

In another embodiment, a 4-port UE can also be configured. In addition to being capable of operating in full coherent and non-coherent configuration, a 4-port UE is also capable of operating in partial coherent configuration. The network accounts for this additional capability when configuring the UE. Specifically, as with previous embodiments, the UE indicates to the network as to whether the UE is capable of operating in Modes 0, 1 or 2. Then, the network determines the codebookSubset of the UE. When the codebookSubset is nonCoherent or partialAndNonCoherent, the network configures the UE to operate in Modes 0, 1 or 2 depending on the UE's indicated capabilities. If the UE has indicated that it is not capable of operating in any of Modes 0, 1 or 2, then the network configures UE to operate in Mode 3.

Alternatively, when the codebookSubset is configured as fullyAndPartialAndNonCoherent, Mode 1 is no longer available. Thus, the network configures the UE to operate in Modes 0 or 2, depending on the UE's reported capabilities. If the UE has indicated that it is not capable of operating in either of Modes 0 or 2, then the network configures the UE to operate in Mode 3. Once again, even though the network may generally configure SRS resource with a different number of ports in an SRS resource set, it is prohibited from doing so when Mode 2 is selected. This is because, in Mode 2, it is unnecessary to configure the SRS resource with a different number of ports.

Figure 3:
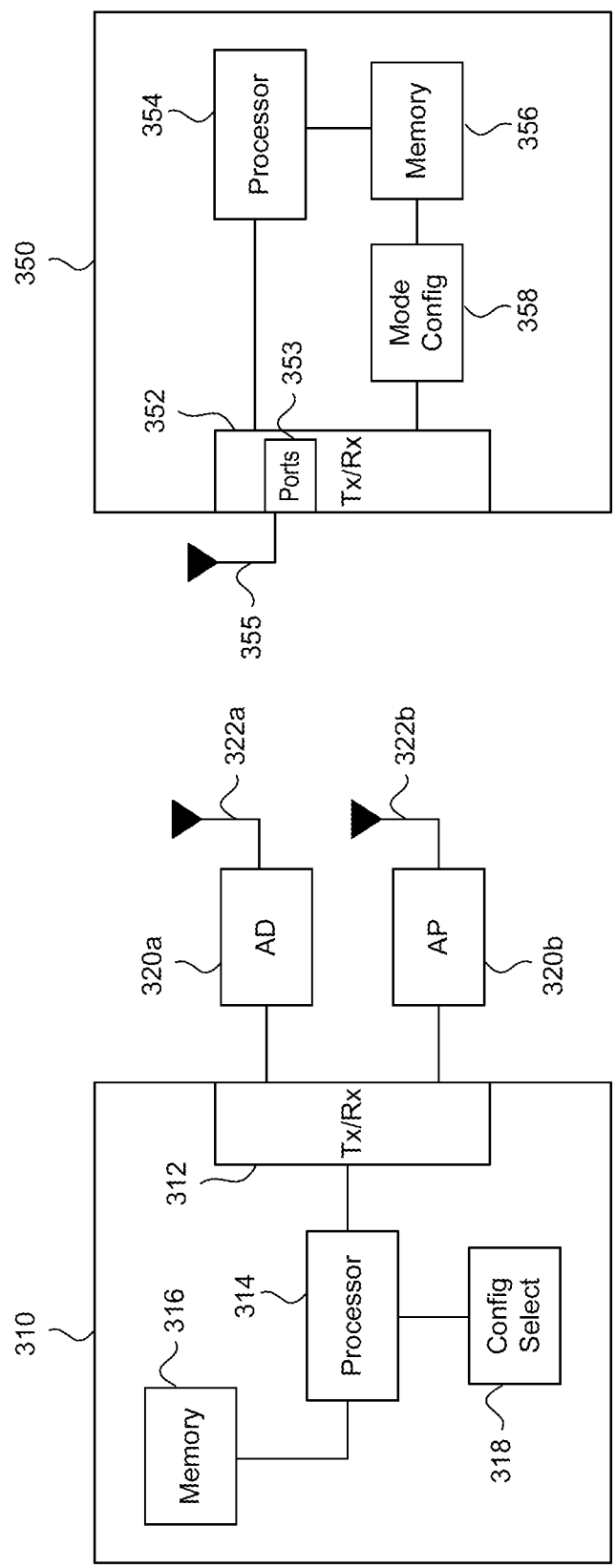
FIG. 3 illustrates a functional block diagram of an exemplary wireless communication environment according to an embodiment.

FIG. 3 illustrates a functional block diagram of an exemplary wireless communication environment 300 according to an embodiment. The environment includes a plurality of access points 320 that provide that provide wireless connectivity from the network backend 310 to a UE 350. In an embodiment, the access points 320 correspond to any of base stations 110 or 120, and UE 350 corresponds to UE 140 of FIG. 1. For purposes of explanation, only relevant functional blocks of the network 310 and the UE 350 are illustrated.

As shown in FIG. 3, the UE 350 includes a transceiver 352 connected to an antenna 355. The transceiver includes a number of logical ports 352. A processor 354 is connected to the transceiver 352 and carries out most processing in the UE 350. The processor is also connected with a memory 356. A mode configuration 358 sets the mode designated by the network.

As shown in FIG. 3, the network 310 includes a transceiver 312 that sends and receives information with the access points 320a and 320b. Although only two connected access points are illustrated, it should be understood that the network 310 can connect with any number of access points 320. The network backend 310 includes a processor 314 that is connected with the transceiver 312. A memory 316 and a configuration select block 318 are connected to the processor 314. Although illustrated as separate components, it should be understood that the functional blocks can be implemented separately or integrated with each other in any combination.

In accordance with the above embodiment, the processor 354 of the UE 350 accesses the memory 356 in order to access the UE's capabilities. The processor packages the UE capabilities and causes the transceiver 352 to transmit the capabilities to the network 310 via the antenna(s) 355. The message is received by one or more of the access points 320, and forwarded to the network 310. The network receives the capabilities via the transceiver 312. The processor 314 decodes the received information in order to identify the capabilities of the UE. Configuration select 318 then selects an appropriate full power transmission mode based on the UE capabilities in accordance with the above embodiments. The selected mode is then packaged by the processor 314. The processor then causes the transceiver 312 to forward the packaged selection in the PUSCH-Config message to the access point(s) 320, which forward the message to the UE 350.

The transceiver 352 of the UE 350 receives the PUSCH-Config message via its antenna(s) 355, and forwards it to the processor 354. The processor 354 extracts the relevant full power transmission mode selection from the PUSCH-Config message, and stores it in memory 356. The mode configure 358 accesses the mode selection stored in the memory 356 and configures the TPMIs, ports 353 and/or other aspects of the transceiver or transceiver logic accordingly, as described with respect to the above embodiments.

Figure 4:
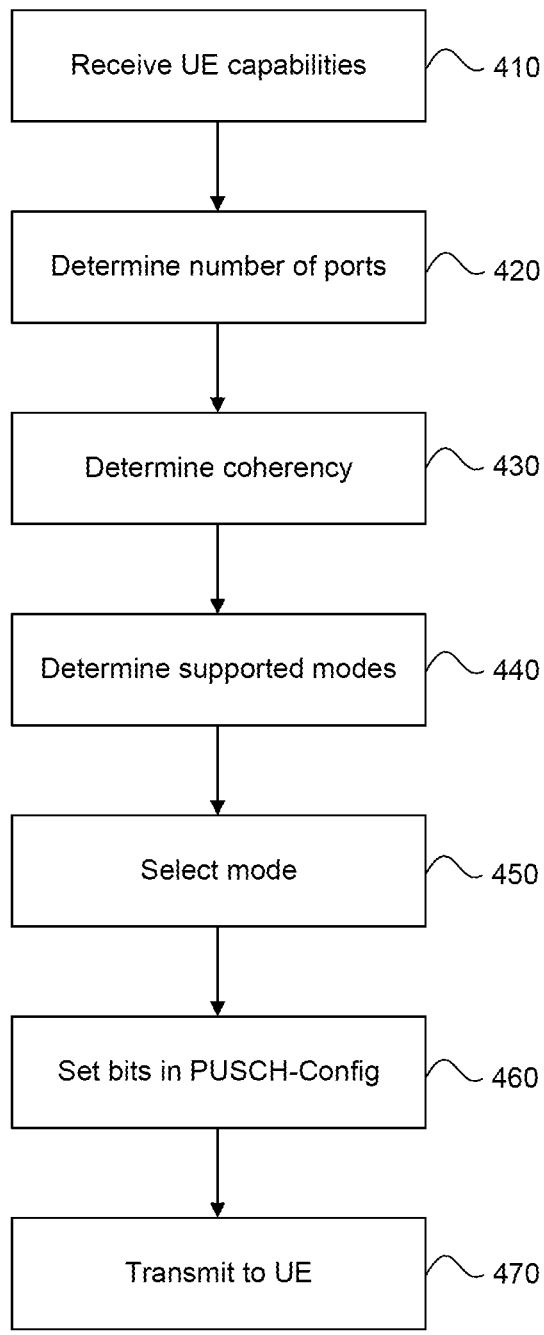
FIG. 4 illustrates a flowchart diagram of a method for setting a full power transmission mode in a UE.

FIG. 4 illustrates a flowchart diagram of a method 400 for setting a full power transmission mode in a UE. As shown in FIG. 4, the network receives UE capabilities from the UE (410). These capabilities can include number of supported ports, supported coherency, and supported full power transmission modes. Therefore, from the received UE capabilities, the network determines the number of ports of the UE (420). This value will generally be either 2 or 4. The network next determines the coherency of the UE (430). For a 2-port UE, this will be either coherent or non-coherent. For a 4-port UE, this may also include partial coherent.

The network then identified from the received capabilities whether the UE has identified any supported full power transmission modes (440). Based on the port, coherency, and mode information received from the UE, the network then selected a mode (450). As described above, there are four available full power transmission modes in the embodiments of this disclosure. Once the mode has been selected, the network configures the bits of the PUSCH-Config signal (460). The resulting signal is then transmitted to the UE (470).

Although the method has been described according to one implementation, it should be understood that many of the steps may be carried out in different order or omitted according to the specific circumstances of the application.

BDFactor Indication

Downlink Control Information (DCI) is transmitted over a Physical Downlink Control Channel (PDCCH) is a signal that includes information about the Downlink Shared Channel (DL-SCH) resource allocation (e.g., the set of resource blocks containing the DL-SCH), transport format, and information related to the DL-SCH Hybrid Automatic Repeat Request (HARD). To form the PDCCH payload, the DCI undergoes channel coding (e.g., the addition of a CRC attachment, followed by convolutional coding and rate matching according to PDCCH format capacity). Likewise, decoding of the DCI takes place upon reception.

Additionally, it is common for the a single PDCCH transmission to carry DCI information for multiple UEs. Because the UE is not explicitly informed of the detailed control channel structure, it must blindly attempt to decode the control region. This is referred to as "blind detection" or "blind decoding."

In multi-TRP (multiple transmission and reception point), the UE is connected to multiple serving cells. In this configuration, the UE can receive a single DCI dictating communication to all serving cells, or can receive multi-DCI. In the case of multi-DCI, a different DCI is provided for each serving TRP. In the latter scenario, the UE must determine how to correctly decode the DCI information for each of the serving cells. The UE's ability to correctly decode this information depends on the amount of channel complexity that the UE can handle. Based on the UE's ability, the network can set a value BDFactorR that controls the PDCCH decoding complexity in terms of the number of blind detection and non-overlapping control channel elements (CCEs) present in the transmission.

In an embodiment, the BDFactorR can be configured at a per cell level. In this embodiment, for a cell i, if the cell is configured to operate in multi-DCI mode, then the BDFactor of the cell i is used to determine the maximum number of blind detection and non-overlapping CCEs. On the other hand, the if the cell i is not configured to operate in multi-DCI mode, then BDFactorR is assumed to be 1, and this value is used to determine the maximum number of blind detection and non-overlapping CCEs.

In another embodiment, BDFactorR can instead be configured at a per cell group level. In this embodiment, the same BDFactorR is used for all the cells in the cell group.

With reference to FIG. 3, in accordance with the above embodiment, the processor 354 of the UE 350 accesses the memory 356 in order to access the UE's capabilities. The processor packages the UE capabilities and causes the transceiver 352 to transmit the capabilities to the network 310 via the antenna(s) 355. The message is received by one or more of the access points 320, and forwarded to the network 310. The network receives the capabilities via the transceiver 312. The processor 314 decodes the received information in order to identify the capabilities of the UE.

Configuration select 318 then selects an appropriate BDFactorR based on the UE capabilities in accordance with the above embodiments. The selected BDFactorR is then referenced by the processor 314 when generating the DCI signals for transmission to the UE, or is employed by the access points for the same.

Figure 5:
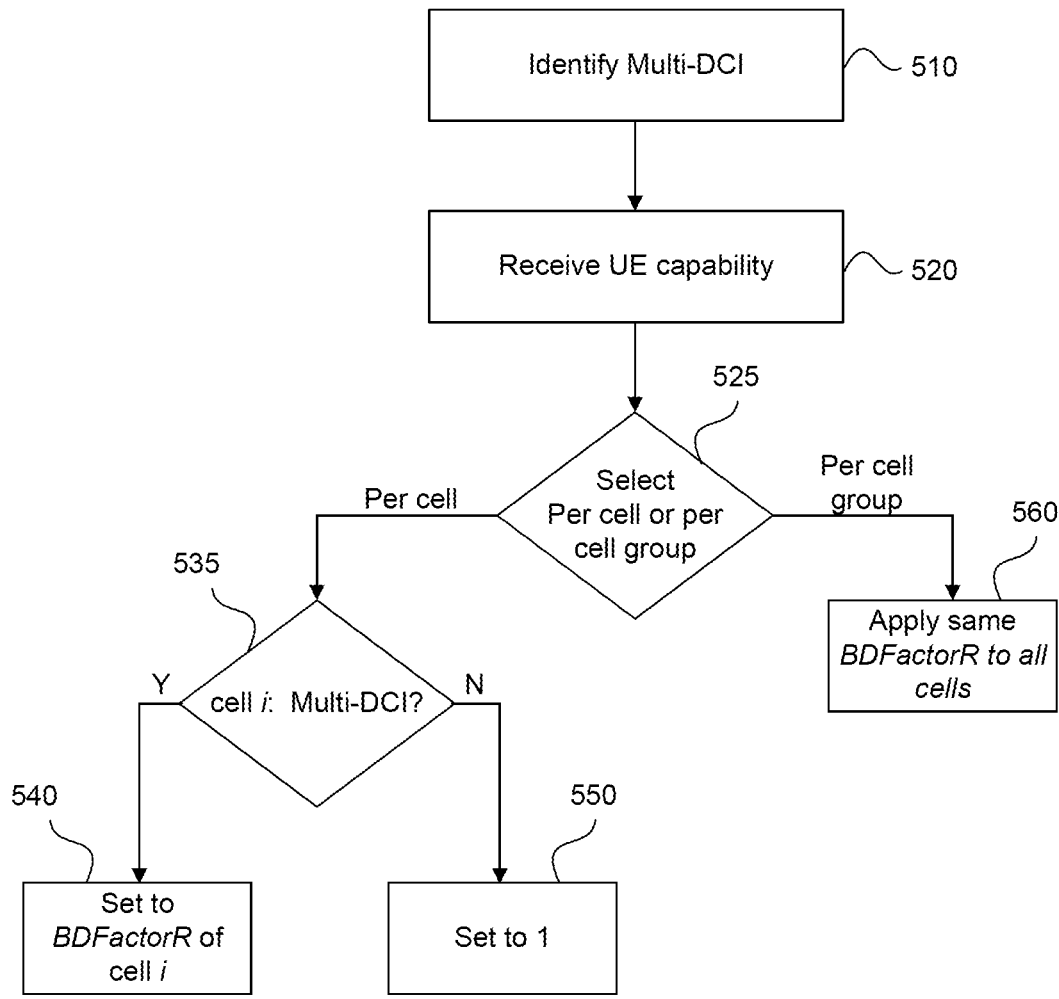
FIG. 5 illustrates a flowchart diagram of a method for configuring the PDCCH complexity.

FIG. 5 illustrates a flowchart diagram of a method 500 for configuring the PDCCH complexity. As shown in FIG. 5, the network identifies that the UE is operating in Multi-DCI and Multi-TRP (510). The network receives the UE capabilities (520) regarding the level of complexity that the UE is capable of handling with respect to blind detection. Based on this information, the network then configures the cells with the appropriate complexity. Specifically, for Multi-TRP, the network can choose whether to configure each cell independently (per-cell), or configure all cells within a cell group together (per cell group) (525).

When per-cell configuration is selected (525 per cell), the network then determines whether a given cell i is operating in multi-DCI. If it is (535-Y), then the network sets the complexity for cell i to be equal to the BDFactorR of that cell. On the other hand, if the cell i is not operating in Multi-DCI (535-N), then the network sets the complexity to be 1.

Meanwhile, if the network selects to configure the cells in a group (525 per cell group), then the network configures all cells in the group to have the same BDFactorR (560).

Multi-TRP Configuration of FDM/TDM Schemes

As discussed above, in Multi-TRP, the UE is being served by multiple cells. Thus, the transmission scheme between each of the serving TRPs. For example, there are multiple frequency domain multiplexing (FDM) schemes (FDMSchemeA and FDMSchemeB) and multiple time domain multiplexing (TDM) schemes (TDMSchemeA and TDMSchemeB) available for communication between the UE and the respective serving cells. Notably, these communication schemes are not mutually exclusive.

In the current 3GPP specification, dynamic switching between different communication schemes is disclosed. In that configuration, the network tracks multiple variables present in the communication system. These variables may include, for example, the number of indicated beams (e.g., Transmission Configuration Indication (TCI)), a number of Code Domain Multiplexing (CDM) groups, the Time Domain Resource Assignment (TDRA) indicated in the DCI, and the Radio Resource Control (RRC) configuration. Depending on the values of these variables, the network adjusts the behavior of the UE. In an embodiment, the UE behaviors can be hardcoded into the specification, such that the UE can adjust its behavior without receiving explicit instruction from the network.

Table 1 below lists the relevant variable values and the corresponding UE behavior.

| # indicated TCI states in DCI | # CDM groups | TDRA | RRC configuration | UE Behavior |
|---|---|---|---|---|
| 1 | >=1 | Does not contain RepNum16 | N/A | Rel-15 |
| 2 | 1 | N/A | RepSchemeEnabler = 'FDMSchemeA' or 'FDMSchemeB' or 'TDMSchemeA' | FDMSchemeA/B or TDMSchemeA |
| 1 | 1 | Contains | RepNum16 is configured in | TDMSchemeB |

-continued

| # indicated TCI states in DCI | # CDM groups | TDRA | RRC configuration | UE Behavior |
|---|---|---|---|---|
|  |  | RepNum16 | at least one entry in PDSCH-TimeDomainResourceAllocation |  |
| 2 | 1 | Contains RepNum16 | RepNum16 is configured in at least one entry in PDSCH-TimeDomainResourceAllocation | TDMSchemeB |
| 2 | 2 | Does not contain RepNum16 |  |  |

As illustrated in the above table, depending on the variable values, the communication scheme of the UE can be dynamically adjusted. For example, as shown in the first row, the number of TCI states is 1, the number of CDM groups is less than or equal to 1, and the TDRA does not contain the value RepNum16. In this scenario, the UE follows release 15 behavior. The remainder of Table 1 can be read similarly. For example, in the fourth configuration (row), there are 2 TCI states, 1 CDM group, the TDRA contains RepNum16, and the RepNum16 is configured in at least one entry in PDSCH-TimeDomainResourceAllocation. When the variable values satisfy those in this row, the UE employs TDMSchemeB (e.g., scheme 3 or inter-slot TDM scheme).

According to an embodiment of the present disclosure, an additional configuration is disclosed. In this embodiment, the UE can be configured to operate in spatial domain multiplexing (SDM), also referred to as Non-Coherent Joint Transmission (NCJT), when two conditions are met. Specifically, provided that the UE is indicated with two TCI states in DCI and 2 DMRS CDM groups in DCI, then SDM can be assumed regardless of other configurations. In other embodiments, scheme 1a can be assumed.

In another embodiment, TDMSchemeA can be prioritized when there is conflict between two or more schemes. In this embodiment, the UE is configured with RepSchemeEnabler. Then, the occurrence of any of three conditions can trigger prioritization of TDMSchemeA. The first condition occurs when the UE does not expect RepNum16 to be configured in any entry in PDSCH-TimeDomainResourceAllocation. The second condition occurs when the UE ignores RepNum16 that is configured in any entry in PDSCH-TimeDomainResourceAllocation. The third condition occurs when the UE does not expect the DCI to indicate an entry in PDSCH-TimeDomainResourceAllocation that contains RepNum16. When any of these conditions occur, the UE prioritizes TDMSchemeA regardless of other configurations.

In another embodiment, TDMSchemeB can be prioritized. This embodiment can occur when the UE is configured with RepNum16 in at least one entry in PDSCH-TimeDomainResourceAllocation. In this embodiment, the prioritization of TDMSchemeB occurs when the UE does not expect RepSchemeEnabler to be configured. Specifically, under this condition, the user equipment is not expected to be configured with RepSchemeEnabler, or the user equipment ignores RepSchemeEnabler if configured. The user equipment is expected to operate in TDMSchemeB, or mode 4 or inter-slot TDM scheme.

In another embodiment, error resolution is provided. Specifically, it is possible for the UE to be configured with RepNum16 in the DCI TDRA field, and to be configured with RepSchemeEnabler to be one of FDMSchemeA, FDMSchemeB, or TDMSchemeA. But this is an invalid state, which causes an error. As a result, when both of these conditions are satisfied, the UE operates in the scheme indicated by RepSchemeEnabler according to a first embodiment. Alternatively, in another embodiment, when these conditions are satisfied, the UE operates in an inter-slot TDM scheme, such as scheme 4 or TDMSchemeB.

Figure 6:
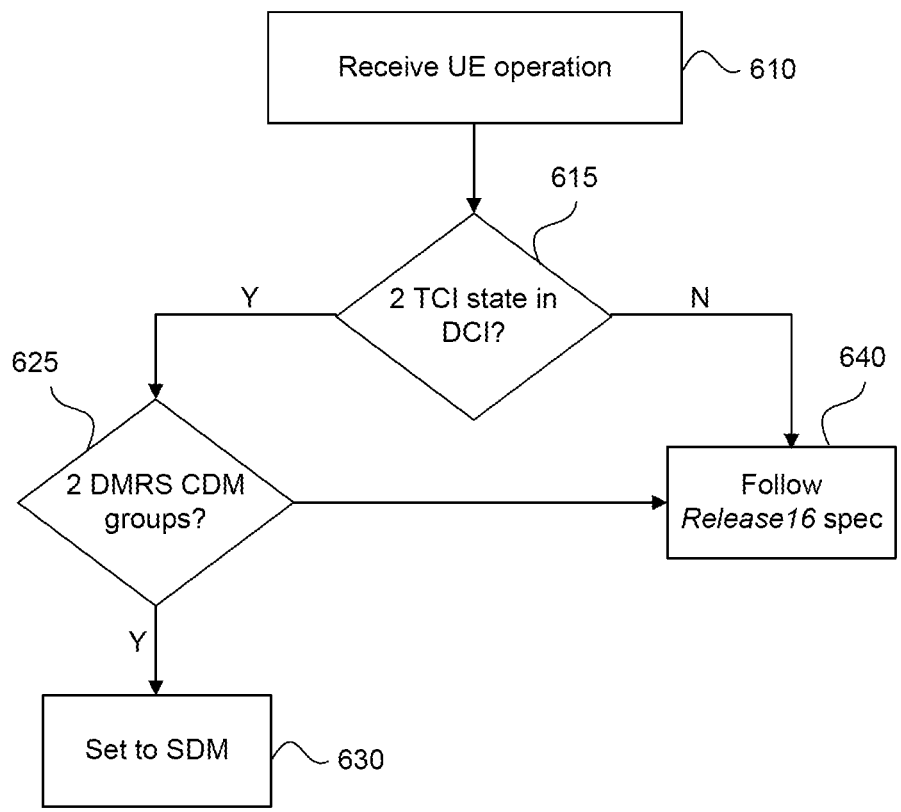
FIG. 6 illustrates a flowchart diagram of an exemplary method of configuring a communication scheme for the UE.

FIG. 6 illustrates a flowchart diagram of an exemplary method 600 of configuring a communication scheme for the UE. As shown in FIG. 6, the network receives information regarding the UE operation (610), such as the number of TCI State in DCI and the number of DMRS CDM groups in DCI. Based on this information, the network determines whether the UE is indicated with 2 TCI State in DCI. If it does (615-Y), then the network determines whether the UE has 2 DMRS CDM groups (625). If it does, then the network sets the UE to operate in SDM (630).

On the other hand if the network determines that the UE is not identified with 2 TCI State in DCI (615-N), or that the UE is not identified with 2 DMRS CDM groups (625-N), then the network configures the UE to operate according the dynamic configurations defined in Release 16 (640). Although the above method is described as though it is carried out by the network, it should be understood that method can likewise be implemented by the UE.

Figure 7:
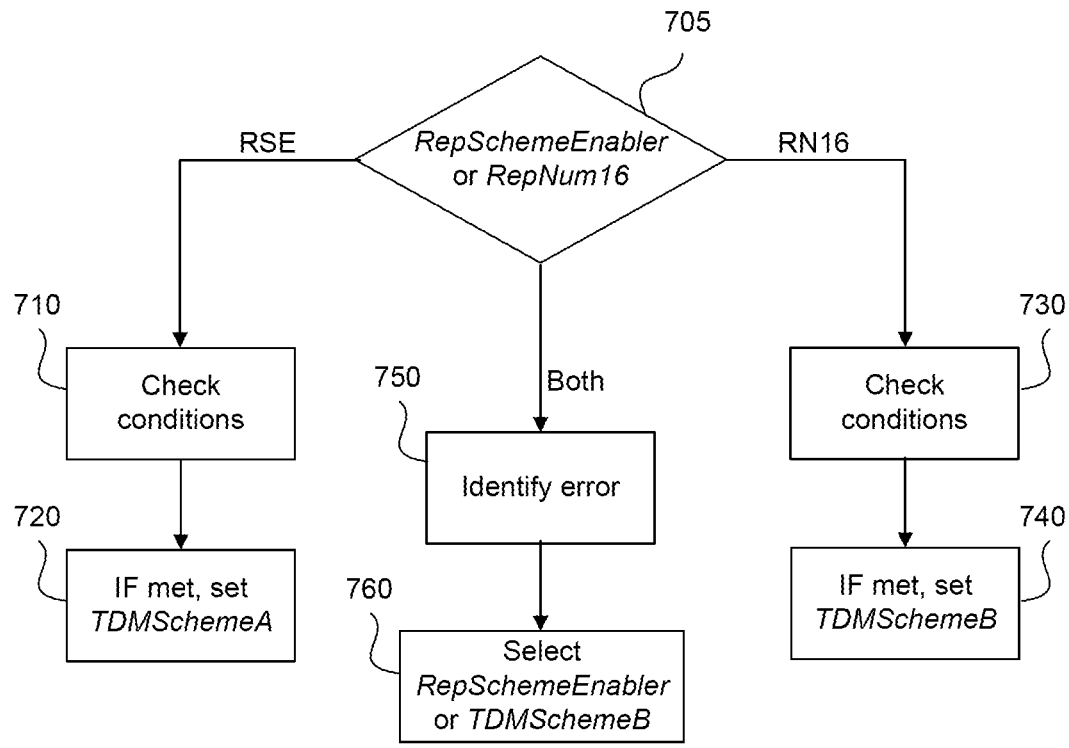
FIG. 7 illustrates a flowchart diagram of an exemplary method for selecting a communication scheme according to embodiments of the present disclosure.

FIG. 7 illustrates a flowchart diagram of an exemplary method 700 for selecting a communication scheme according to embodiments of the present disclosure. As shown in FIG. 7, the UE identifies whether it is configured with RepSchemeEnabler, or RepNum16 in at least one entry in PDSCH-TimeDomainResourceAllocation. If the UE is configured only with RepSchemeEnabler (705-RSE), then the UE checks whether certain conditions are met 710. For example, the UE determines whether it does not expect RepNum16 to be configured in any entry in PDSCH-TimeDomainResourceAllocation, whether the UE ignores RepNum16 that is configured in any entry in PDSCH-TimeDomainResourceAllocation, or whether The third condition occurs when the UE does not expect the DCI to indicate an entry in PDSCH-TimeDomainResourceAllocation that contains RepNum16. When any of these conditions occur (720), the UE prioritizes TDMSchemeA regardless of other configurations.

On the other hand, if the UE identifies that the UE is configured with RepNum16 in at least one entry in PDSCH-TimeDomainResourceAllocation (705-RN16), then the UE analyzes another set of conditions (730). In this instance, the UE determines whether it expects RepSchemeEnabler to be configured. If it does not, then the UE prioritizes TDMSchemeB.

Lastly, if the UE identifies that the UE is configured with both RepNum16 and RepSchemeEnabler (705-BOTH), then the UE identifies this condition as an error (750). As a result, the UE selects whether to operate in the scheme indicated by RepSchemeEnabler or in TDMSchemeB. Although the above method has been described as taking place at the UE, it should be understood that the method 700 could be carried out by the network, which would require additional steps of receiving configuration information from the UE, and notifying the UE of the selected configuration.

Figure 8:
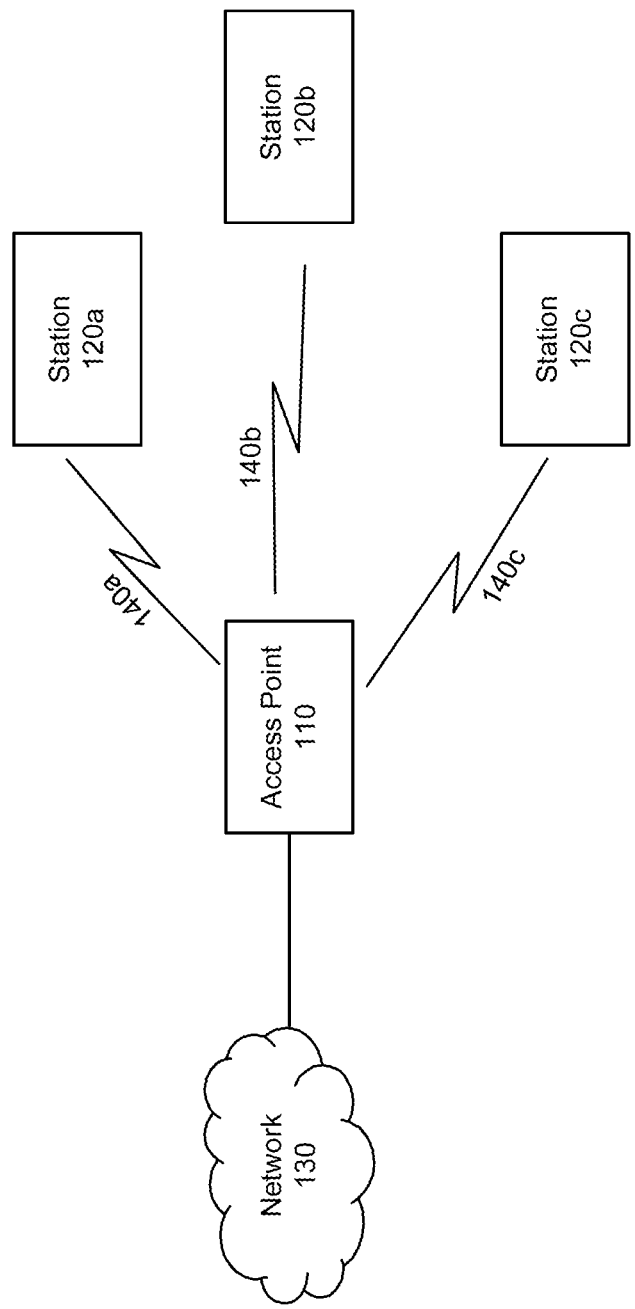
FIG. 8 illustrates an exemplary system implementing measurement signal collision resolution, according to some embodiments of the disclosure.

FIG. 8 illustrates an exemplary system 800 implementing measurement signal collision resolution, according to some embodiments of the disclosure. Example system 800 is provided for the purpose of illustration only and does not limit the disclosed embodiments. System 800 may include, but is not limited to, access point (AP) 810, stations (STA) 820, and network 830. Stations 820a-820c may include, but are not limited to, Wireless Local Area Network (WLAN) stations such as wireless communication devices, smart phones, laptops, desktops, tablets, personal assistants, monitors, televisions, wearable devices, and the like. Access point (AP) 810 may include but is not limited to WLAN electronic devices such as a wireless router, a wearable device (e.g., a smart watch), a wireless communication device (e.g., a smart phone), or a combination thereof. Network 830 may be the Internet and/or a WLAN. Station 820's communications are shown as wireless communications 840. The communication between AP 810 and STA 820 can take place using wireless communications 840a-840c. The wireless communications 840a-840c can be based on a wide variety of wireless communication techniques. These techniques can include, but are not limited to, techniques based on IEEE 802.11 (such as, but not limited to, IEEE 802.11ac, IEEE 802.11ax, IEEE 802.11bc, IEEE 802.11bd, IEEE 802.11be, IEEE 802.11v, etc.)

Figure 9:
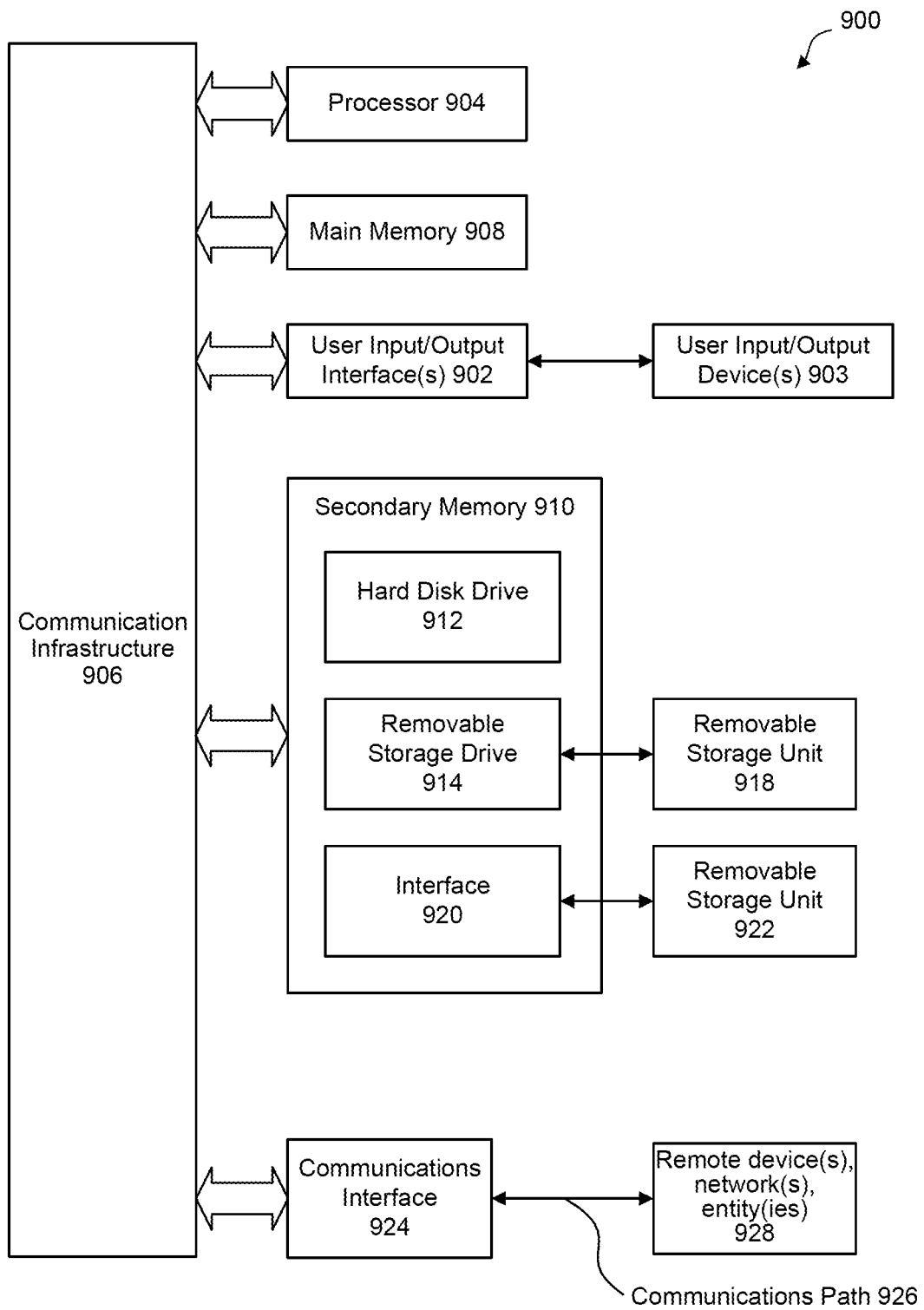
FIG. 9 illustrates a block diagram of an exemplary generic computer system capable of implementing certain aspects of the present disclosure.

Various embodiments can be implemented, for example, using one or more computer systems, such as computer system 900 shown in FIG. 9. Computer system 900 can be any well-known computer capable of performing the functions described herein such as devices 910, 920 of FIG. 9, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A user equipment (UE), comprising:
a memory that stores at least one full power transmission mode capability of the UE;
a transceiver configured to transmit and receive information with a communications network; and
one or more processors configured to:
cause the transceiver to transmit a capabilities message to the communications network, the capabilities message indicating whether the UE supports each of four different full power transmission modes;
receive a configuration message from the communications network via the transceiver;
determine a selected full power transmission mode from the configuration message; and
configure the transceiver according to the selected full power transmission mode from among the four different full power transmission modes,
wherein the four different full power transmission modes include a mode in which power scaling is set equal to a ratio between a number of non-zero power ports of a configured transmitted precoder matrix indicator (TPMI) and a maximum number of ports of the UE.

2. The UE of claim 1, wherein the configuration message is a PUSCH-Config message.

3. The UE of claim 1, wherein the transceiver includes a plurality of logical ports, and
wherein the memory further stores a number of the plurality of logical ports and a coherency capability of the UE.

4. The UE of claim 3, wherein the capabilities message includes the number of the plurality of logical ports and the coherency capability of the UE.

5. The UE of claim 3, wherein the number of the plurality of logical ports is 2, and the coherency capability includes full coherent, and
wherein the four different full power transmission modes include at least one of Mode 0 or Mode 2, Mode 2 setting some transmitted precoder matrix indicators (TPMIs) to power scaling 1 and other TPMIs to a different power scaling value.

6. The UE of claim 3, wherein the number of the plurality of logical ports is 4, and the coherency capability includes full coherent, and
wherein the four different full power transmission modes include at least one of Mode 0 or Mode 2, Mode 2 setting some transmitted precoder matrix indicators (TPMIs) to have power scaling 1 and other TPMIs to a different power scaling value.

7. The UE of claim 1, wherein the four different full power transmission modes further include Mode 0, and
wherein Mode 0 sets all power scaling to 1.

8. A method of setting a full power transmission mode in a user equipment (UE), comprising:
transmitting a capabilities message to a communication network, the capabilities message indicating whether the UE supports each of four different full power transmission modes;
receiving a configuration message from the communication network;
determining a selected full power transmission mode from the configuration message; and
configuring a transceiver according to the selected full power transmission mode from among the four different full power transmission modes,
wherein the four different full power transmission modes include a mode in which power scaling is set equal to a ratio between a number of non-zero power ports of a configured transmitted precoder matrix indicator (TPMI) and a maximum number of ports of the UE.

9. The method of claim 8, wherein the configuration message is a PUSCH-Config message.

10. The method of claim 8, further comprising receiving a number of logical ports supported by a transceiver of the UE and a coherency capability of the UE.

11. The method of claim 10, wherein the capabilities message includes the number of logical ports supported by the transceiver and the coherency capability of the UE.

12. The method of claim 10, wherein the selected full power transmission mode is one of the four different modes, and is selected based on the capabilities of the UE.

13. The method of claim 12, wherein the four different full power transmission modes further include a Mode 0 in which all power scaling is set to 1.

14. The UE of claim 1, wherein the one or more processors are further configured to receive a port selection from the communications network.

15. The UE of claim 14, wherein the port selection is based on a codebookSubset and capabilities of the UE.

16. The UE of claim 15, wherein the port selection is based on whether the codebookSubset is nonCoherent or whether the codebookSubset is configured as fullyAndPartialAndNonCoherent.

17. An apparatus, comprising:
a memory that stores at least one full power transmission mode capability of a user equipment (UE); and
one or more processors configured to:
transmit a capabilities message to the communications network, the capabilities message indicating whether the UE supports each of four different full power transmission modes;
receive a configuration message from the communications network via the transceiver; and
determine a selected full power transmission mode from the configuration message,
wherein the four different full power transmission modes include a mode in which power scaling is set equal to a ratio between a number of non-zero power ports of a configured transmitted precoder matrix indicator (TPMI) and a maximum number of ports of the UE.

18. The apparatus of claim 17, further comprising a transceiver, wherein the one or more processors are further configured to:

cause the transceiver to transmit the capabilities message; and configure the transceiver according to the selected full power transmission mode.

19. The apparatus of claim 18, wherein the transceiver includes a plurality of logical ports,
    wherein the memory further stores a number of the plurality of logical ports and a coherency capability of the UE, and wherein the capabilities message includes the number of the plurality of logical ports and the coherency capability of the UE.

20. The apparatus of claim 17, wherein the configuration message is a PUSCH-Config message.

* * * * *